(12) United States Patent
Van Delft Westerhof

(10) Patent No.: US 11,945,134 B2
(45) Date of Patent: *Apr. 2, 2024

(54) TRANSLUCENT BUILDING ELEMENT AND METHOD OF MANUFACTURING SAME

(71) Applicant: Zospeum Holding B.V., The Hague (NL)

(72) Inventor: Pieter Jan George Van Delft Westerhof, The Hague (NL)

(73) Assignee: ZOSPEUM HOLDING B.V., The Hague (NL)

(*) Notice: Subject to any disclaimer, the term of this patent is extended or adjusted under 35 U.S.C. 154(b) by 111 days.

This patent is subject to a terminal disclaimer.

(21) Appl. No.: 17/136,704

(22) Filed: Dec. 29, 2020

(65) Prior Publication Data

US 2021/0114255 A1 Apr. 22, 2021

Related U.S. Application Data

(63) Continuation of application No. 15/574,768, filed as application No. PCT/NL2016/050358 on May 19, 2016, now Pat. No. 10,906,204.

(30) Foreign Application Priority Data

May 19, 2015 (NL) .................................... 2014822

(51) Int. Cl.
*E04C 1/40* (2006.01)
*B28B 23/00* (2006.01)
(Continued)

(52) U.S. Cl.
CPC .......... *B28B 23/0037* (2013.01); *E04C 2/288* (2013.01); *E04C 2/54* (2013.01);
(Continued)

(58) Field of Classification Search
CPC ... E04C 1/42; E04C 2/546; E04C 1/41; E04C 2/044; E04F 13/0871
See application file for complete search history.

(56) References Cited

U.S. PATENT DOCUMENTS 8,869,480 B2 10/2014 Klem, Jr.
2010/0281802 A1* 11/2010 Losonczi ............ B28B 23/0037
264/261

(Continued)

FOREIGN PATENT DOCUMENTS

CN 101372133 A * 2/2009 ............... E04C 1/42
CN 103603458 A 2/2014
(Continued)

*Primary Examiner* — Phi D A
(74) *Attorney, Agent, or Firm* — Hoffmann & Baron, LLP

(57) ABSTRACT

The present invention is related to translucent building elements, and more specifically to their manufacture. The present invention comprises a method for the manufacture of an insulating core element for a translucent building element, an insulating core element for a translucent building element, a method for the manufacture of a translucent building element, a translucent building element, a method for the manufacture of a translucent building wall, a translucent building wall, and a method for the manufacture of a multiple of stacked rows of elongated light-conducting elements for an insulating core element.

20 Claims, 13 Drawing Sheets

(51) Int. Cl.
    *E04C 1/42*     (2006.01)
    *E04C 2/288*     (2006.01)
    *E04C 2/54*     (2006.01)
    *B29C 44/12*     (2006.01)
    *B29L 31/10*     (2006.01)
    *E04C 1/41*     (2006.01)

(52) U.S. Cl.
    CPC .. *B29C 44/1271* (2013.01); *B29K 2995/0026* (2013.01); *B29K 2995/0029* (2013.01); *B29L 2031/10* (2013.01); *E04C 1/41* (2013.01)

(56) References Cited

U.S. PATENT DOCUMENTS

| | | |
|---|---|---|
| 2011/0185660 A1 | 8/2011 | Roye |
| 2014/0030479 A1* | 1/2014 | Christandl ............. B29C 39/10 428/137 |
| 2014/0059952 A1 | 3/2014 | Christandl et al. |

FOREIGN PATENT DOCUMENTS

| | | |
|---|---|---|
| DE | 102008046769 A1 | 3/2010 |
| DE | 202015000056 U1 | 6/2015 |
| EP | 1970179 A2 | 9/2008 |
| EP | 2177332 A1 | 6/2010 |
| JP | 2015057312 A | 3/2015 |
| KR | 101492767 B1 | 2/2015 |

* cited by examiner

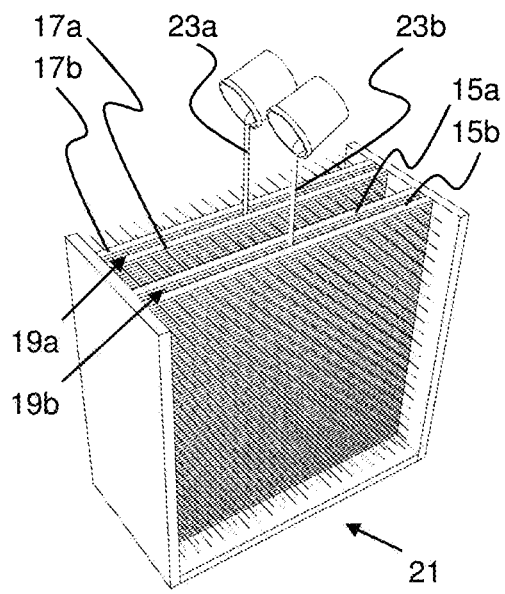
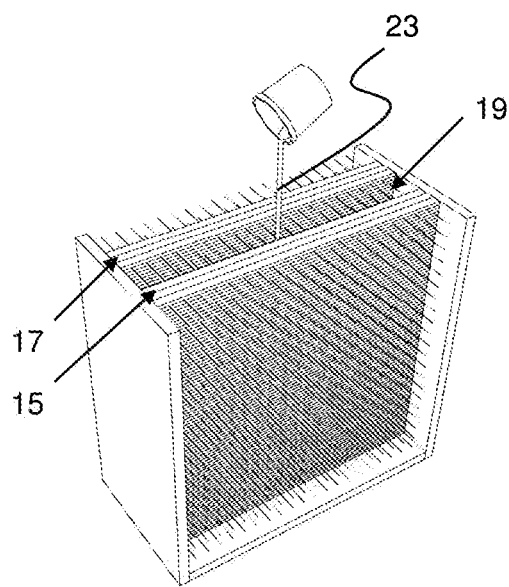
Fig. 21    Fig. 22
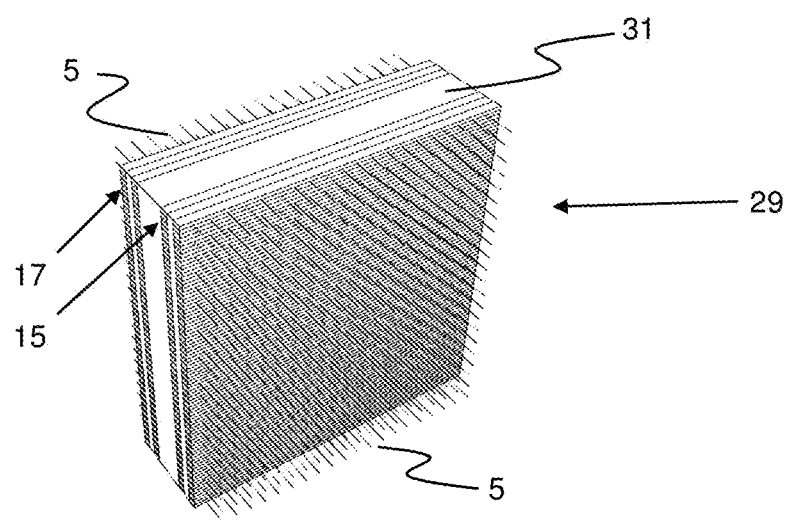
Fig. 23

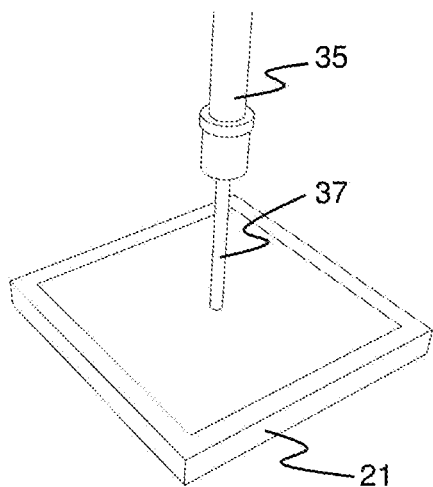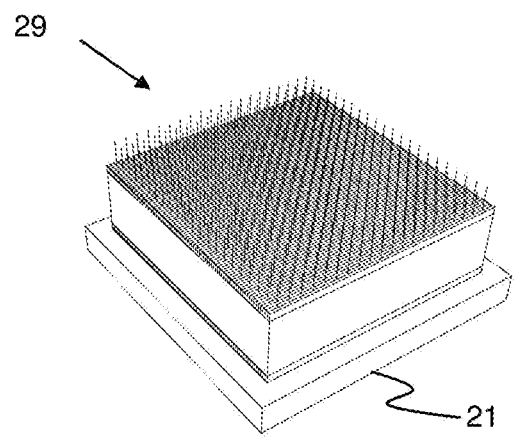
Fig. 24
Fig. 25
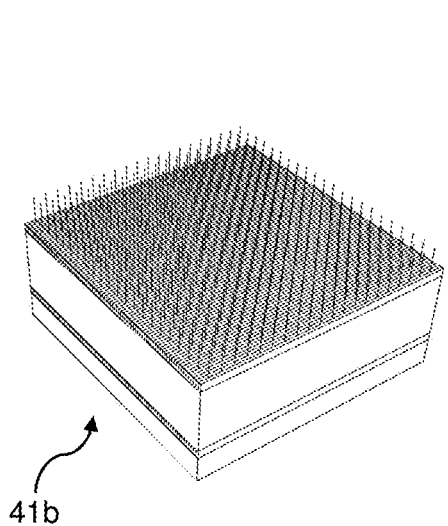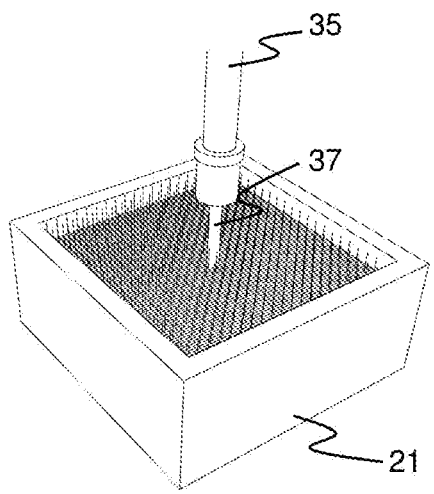
Fig. 26
Fig. 27

TRANSLUCENT BUILDING ELEMENT AND METHOD OF MANUFACTURING SAME

This application claims priority from U.S. patent application Ser. No. 15/574,768, filed on Nov. 16, 2017, which claims priority from the U.S. National Phase of International Patent Application Number PCT/NL2016/050358, filed on May 19, 2016, which claims priority from NL 2014822, filed on May 19, 2015, each of which is incorporated herein by reference.

TECHNICAL FIELD

The various aspects are related to translucent building elements, and more specifically their manufacture.

BACKGROUND

Building elements are known, more specifically concrete elements, with multiple elongated, light-conducting elements, which extend in the structural element between two opposite surfaces so that the ends of each light-guiding element debouch in one of the respective surfaces. Walls in buildings can be made with such translucent concrete elements, where the light-conducting elements debouch in one of the two opposite surfaces of the wall. Light can then travel from one side of the wall to the other through the light-conducting elements, creating a translucent effect where light shines through the wall.

These known translucent concrete elements are manufactured by pouring concrete in a mould, and placing light-conducting elements in the mould, before or during pouring, so that after the concrete has hardened a concrete element results in which the light-conducting elements extend between two opposite surfaces of this element.

SUMMARY

One of the objectives of the various aspects is to provide a solution to the above-mentioned disadvantage of the known translucent concrete elements.

The various aspects provide for this purpose, among others, a method for the manufacture of an insulating core element for a translucent building element.

The method of manufacturing an insulating core element for a translucent building element comprises of providing two separation panels which are substantially parallel to each other, where these separation panels are provided with a grid of multiple elongated light-conducting elements which extend parallel to each other substantially perpendicularly to the two separation panels, and which extend through the separation panels. The method further comprises applying a formwork so that an intermediate space between the two separation panels at least along the panels of the separation panels is closed, then pouring a foam-forming substance in the intermediate space between the separation panels which substance is to form a mono-block of insulating foam, and removal of the formwork after the insulating foam is formed.

This method allows a core element to be manufactured which can in turn be used to manufacture an insulated, translucent building element, such as a concrete element, or an insulated translucent building wall, such as a concrete wall, where the light-conducting elements which pass through the layer of insulating foam can be used to guide light through an insulated, translucent building element or an insulated, translucent building wall. An advantageous way with which such a core element manufactured using this method according to the invention can be used to manufacture a translucent building element or an insulated translucent building wall is described in detail below. The insulating foam is preferably a type of hard foam. Particularly good results are possible with polyurethane foam (PU foam), a 2-component hard foam with a watertight, closed cell structure.

The method of manufacturing of a core element according to the invention is in itself particularly advantageous in view of the manner in which the separation panels are obtained through which the elongated, light-conducting elements protrude. These separation panels make it possible to form a particularly effective insulating foam from liquid components in the space between these separation panels, through which space the elongated, light-conducting elements extend. Allowing the separation panels to arise, in accordance with the invention, from the stacking of rows of mutually connected, elongated, light-conducting elements means it is not necessary, for example, to pass the light-conducting elements one by one through two panels with holes in order to create the separation panels.

In one advantageous embodiment of this aspect, the provision of two separation panels comprises providing a pair of auxiliary panels which are substantially parallel to each other, where these auxiliary panels are provided with the grid of multiple elongated light-conducting elements which extend parallel to each other, substantially perpendicular to the two auxiliary panels and extend through the auxiliary panels, creating a first compartment between the auxiliary panels of the first pair of auxiliary panels, and provide a second pair of auxiliary panels which are substantially parallel to each other, and which auxiliary panels are provided with the grid of multiple elongated light-guiding elements which extend parallel to each other, substantially perpendicular to the two auxiliary panels and extend through the auxiliary panels, creating a second compartment between the auxiliary panels of the second pair of auxiliary panels. This embodiment further comprises applying formwork so that the first auxiliary space and the second auxiliary space between the separation panels at least are closed along the panels of the auxiliary panels, then pouring reactive components into the first compartment to form a first separation panel of insulating foam; and in the second compartment pouring reactive components which form a second separation panel of insulating foam.

An advantage of this embodiment is that robust separation panels are obtained, which are resistant to the pressure and temperature, which occur in foam formation of larger amounts of foam-forming substance.

In a further advantageous embodiment of this aspect, the provision of two separation panels, respectively the auxiliary panels, comprises the provision of multiple stacked rows of elongated light-conductive elements, where each row comprises multiple elongated light-conducting elements positioned next to each other and which are mutually connected by means of at least two elongated connecting elements extending substantially parallel to each other and substantially perpendicular to the longitudinal direction of the light-conducting elements at a distance from the ends of the light-conducting elements, whereby the connecting elements of two rows stacked on top of each other are in sealing contact with each other, so that the connection elements of the stacked rows form at least two separation panels, respectively auxiliary panels, which extend substantially perpendicularly to the longitudinal direction of the light-conducting elements, and define an intermediate space, respectively compartment, between them.

In the method for manufacturing an insulating core element in accordance with this aspect, several alternative and advantageous methods are provided on which the multiple stacked rows of elongated light-conducting elements with separation panels can be provided.

According to a first advantageous embodiment, providing multiple stacked rows of elongated light-conducting elements comprises:
 (a) arranging multiple elongated light-conducting elements side by side in a row; and
 (b) mutually connecting the elongated light-conducting elements by means of at least two elongated connecting elements which extend substantially parallel to each other and substantially perpendicularly to the longitudinal direction of the light-conducting elements;
 (c) placing a following row of interconnected elongated light-conducting elements on the row of mutually connected elongated light-conducting elements according to steps (a) and (b), whereby the connecting elements of the following row are placed in sealing contact with the connecting elements of the preceding row;
 (d) repeating step (c).

In this embodiment, a new row of elongated, light-conducting elements is repeatedly formed on a preceding row after the forming of the preceding row, whereby, when connecting the new row of elongated, light-conducting elements, the connecting elements of the new row are brought into sealing contact with the connection elements of the preceding row, so obtaining the multiple stacked rows of elongated light-conducting elements with the separation panels.

In an alternative, second advantageous embodiment, providing multiple stacked rows of elongated light-conducting elements comprises:
 providing multiple light-conducting mats, whereby each light-conducting mat contains multiple elongated light-conducting elements arranged in a row next to each other which are interconnected by means of at least two elongated connecting elements extending substantially parallel to each other, and which extend substantially perpendicularly to the longitudinal direction of the light-conducting elements; and
 stacking the light-conducting mats on each other, where the connecting elements of each two stacked light-conducting mats are brought into sealing contact with each other.

In this embodiment, separate mats are produced, each of which forms a row of mutually connected elongated, light-conducting elements. These mats are stacked on top of each other, whereby the connecting elements are brought into sealing contact with each other, in order to obtain the multiple stacked rows of elongated light-conducting elements with the separation panels.

In an alternative, third advantageous embodiment, providing a multiple of stacked rows of elongated light-conducting elements comprises:
 providing a light-conducting mat which comprises multiple elongated light-conducting elements arranged in a row next to each other which are interconnected by means of at least two elongated connecting elements extending substantially parallel to each other and which extend substantially perpendicularly to the longitudinal direction of the light-conducting elements; and
 stacking two successive portions of the light-conducting mat on each other by folding the light-conducting mat, whereby the connecting elements of each two stacked portions of the light-conducting mat are brought into sealing contact with each other.

In this embodiment, a stack of multiple rows of light-conducting elements is formed by folding the mat at the end of the row after laying a row, in order to form a next row on the previously laid row, all using a single mat. This means that when folding the mat, the connecting elements of the mat which connect the light-conducting elements with each other are folded over at the same time, and the part of it after the fold is placed in sealing contact with the part in front of the fold, in order to obtain multiple stacked rows of elongated light-conducting elements with the separation panels.

In both the forming of the multiple stacked rows of elongated light-conducting elements with the separation panels by means of separate mats and the forming of multiple stacked rows of elongated light-conducting elements with the separation panels by folding a mat, the step of providing a light-conducting mat in an advantageous embodiment comprises:
 arranging multiple elongated light-conducting elements in a row side by side; and
 mutually connecting the elongated light-conducting elements by means of at least two elongated connecting elements substantially parallel to each other, and which extend substantially perpendicularly to the longitudinal direction of the light-conducting elements.

In addition, in an advantageous embodiment, each connecting element comprises two elongated sections which are arranged on both sides of the light-conducting elements. Thus, in the manufacture of a mat, the elongated elements are enclosed between the two sections. Preferably, at least one of the sections is provided with an adhesive layer which, in connecting the elongated light-conducting elements, is brought in contact with the elongated light-conducting elements and the other section. In this way, after the manufacture of the mat and the subsequent handling of the mat, the light-conducting elements maintain their position relative to the adjacent light-conducting elements. That could avoid, for example, the occurrence of undesired concentrations of light conducting elements as a consequence of light-conducting elements of a mat not remaining in their initial positions in handling operations with the mat, such as stacking, and these elements ending up lying against each other.

In a further advantageous embodiment of the method according to this aspect, at least one of the two connecting elements, which are brought into sealing contact with each other when manufacturing multiple stacked rows of elongated light-conducting elements, is provided with an adhesive layer which is brought into contact with the other connecting element. Thus, whenever placing a new row when stacking rows of light-conducting elements, the new row can be fixed with respect to the preceding row by gluing the connecting elements of the respective successive rows to each other. This avoids openings arising in the separation panels, which are formed when stacking the rows from connecting elements placed in contact with each other, due to the shifting relative to each other of connecting elements, which are in contact with each other during stacking and partly or completely losing contact. In combination with the advantageous embodiment described above in which no mat or mats are stacked, but each time after completion of a row of mutually connected light-conducting elements multiple light-conducting elements are arranged in a row on the finished row, a particularly advantageous embodiment is provided. In this embodiment, the connecting elements of a row to be formed are provided with an upward-facing adhesive layer, on which adhesive layer the light-conducting elements, which are to form the row are arranged in a row. The adhesive layer connects the light-conducting elements to connecting elements. Subsequently, the connecting elements of the next row of light-conducting elements to be formed can be positioned on the light-conducting elements of the preceding row, so that these, in the spaces between adjacent light-conducting elements, are in contact with the upward-facing adhesive layer of the connection elements of the preceding row. If these connecting elements of the next row to be formed are also provided with an upward-facing adhesive layer, the light-conducting elements of the row to be formed can be arranged on the adhesive layer, just as with the preceding row. By repeatedly placing a new row of light-conducting elements on a previous row, the multiple stacked rows of light-conducting elements can be manufactured in an advantageous manner.

In addition to the light-conducting capacity of the light-conducting elements, it is also important that these have such a bending stiffness that the light-conducting elements can remain standing independently and generally vertical over the distance between their ends and the nearby separation panel, with the respective end facing upwards. The importance thereof is explained in more detail below in the description of the method of manufacturing a translucent building element according to the invention.

In a further advantageous embodiment of the method for the manufacture of a core element according to this aspect, the elongated connecting elements are flexible, more specifically in the direction transverse to the plane in which the light-conducting elements of each respective row extend. This means the connecting elements are able to adapt to the course of the connecting element they are brought into contact with during the forming of the stack of a multiple of rows of light-conducting elements. Thus, gaps which might arise between connecting elements brought in contact with each other during stacking that result in holes in the respective separation panel, are avoided.

In a further advantageous embodiment of the method for the manufacture of a core element according to this aspect, the elongated connecting elements are compressible. This makes it possible to partially form connecting elements around the individual light-conducting elements that are connected, in order to thus make possible a sealing contact between the connecting elements and the corresponding mutually connected light-conducting elements. Additionally, the advantage of compressible auxiliary panels and/or separation panels, whether or not composed of elongated connecting elements, is that the structure is resistant to different pressures that occur upon expansion and/or curing of the foam-forming material and hardening of other materials that are used in combination with the core element, such as concrete.

A further aspect also relates to an insulating core element for a translucent building element, preferably but not exclusively obtained from a method according to the invention as described above. According to this aspect, the insulating core element comprises a substantially cuboid-shaped mono-block of insulating foam and a grid of multiple elongated light-conducting elements which extend parallel to each other, substantially perpendicular to a first plane of the mono-block and a second plane of the mono-block, where the second plane is located opposite the first plane, and where the light-conducting elements extend outside the mono-block.

With the help of one or more insulating core elements according to the invention, an insulated, translucent building element, such as a concrete element, or an insulated translucent building wall, such as a concrete wall, can be manufactured, where light can be guided through an insulated, translucent building element or an insulated, translucent construction wall by means of light-conducting elements which pass through the insulating foam layer. An advantageous way with which such a core element manufactured using this method according to the invention can be used to manufacture a translucent building element or an insulated translucent building wall is described in detail below.

In accordance with this aspect, an insulating core element preferably comprises multiple stacked rows of elongated, light-conducting elements where
  each row comprises multiple, side-by-side arranged, elongated, light-conducting elements which are interconnected by means of at least two elongated connecting elements extending substantially parallel to each other and substantially perpendicularly to the longitudinal direction of the light-conducting elements at a distance from the ends of the light-conducting elements;
  and where
  the connecting elements of each two rows stacked on top of each other are in sealing contact with each other, so that the connection elements of the stacked rows form at least two separation panels which extend substantially perpendicularly to the longitudinal direction of the light-conducting elements, and define an intermediate space between them which is filled with an insulating foam.

As already described above, an aspect of the present technique also concerns a method for manufacturing a translucent building element.

The method for manufacturing a translucent building element according to this aspect includes providing an insulating core element as described above. The insulating core element may be provided as finished product, or manufactured on-site, preferably by means of the method for manufacturing an insulating core element according to the invention as described above.

The method for manufacturing a translucent building element according to this aspect further includes the provision of a formwork on the planes of the mono-block, with the exception of the first plane and the second plane, so that on a first side of the core element where the first plane is found a first compartment is formed, with the formwork forming the side walls of the compartment and the first plane forming a base panel, and pouring a hardening material in liquid form in the first compartment. The method further comprises bringing the first plane of the mono-block and the hardening material into contact, such that surfaces of the mono-block other than the first plane and the first plane substantially coincide with the side walls of the compartment; hardening of the hardening material; and removal of the formwork.

One embodiment comprises further applying a formwork along the edges of the separation panels, so that a compartment is formed on either side of the intermediate space of the insulating core element filled with insulating foam, where the formwork forms the side walls of the compartment, and the respective separation panel a base panel through which the elongated light-conducting elements protrude. In this way, two compartments are created, each with a separation panel as a base panel, and an opening opposite the base panel. By orientating the core element and the formwork in such a way that the opening of one of the compartments faces upwards, a compartment with an opening at the top is created containing elongated, light-conducting elements which protrude upwards from the base panel, where the ends of the elongated, light-conducting elements are located at a distance from the base panel. Thus, in a next step of the method for manufacturing a translucent building element according to the invention, a hardening material in liquid form, such as concrete, can be poured into one of the compartments, until at or below the ends of the respective elongated light-conducting elements protruding through the separation panel, in order to then allow the hardening material to harden. Correspondingly, in a subsequent step involving turning over the core element and the formwork so that the as-yet unfilled other compartment is open towards the top, a hardening material in liquid form, such as concrete, can be poured in until at or below the ends of the respective elongated light-conducting elements protruding through the separation panel, in order to then allow the hardening material to harden. By subsequently removing the formwork, an insulated translucent building element is achieved, where light can be guided by the elongated, light-conducting elements from one side of the construction element through the outer layers of hardened material, such as concrete, and the intermediate insulating core layer, to the other side of the building element. Using translucent building elements manufactured in this way, a translucent building wall can be built by stacking the building elements.

Alternatively, a translucent building wall can be manufactured using insulating core elements according to this aspect as described above under a method for manufacturing a translucent building wall. The present invention also concerns such a method where a core wall is formed with multiple insulating core elements according to the invention, where the intermediate spaces filled with insulating foam of adjacent core elements are placed against each other, and the separation panels of the core elements together form separation panels of the core wall. This method for manufacturing a translucent building wall further comprises the application of a formwork along the edges of the separation panels of the core wall, so that on both sides of the core wall a compartment is formed, where the formwork forms the side walls of the compartment and the corresponding separation panel of the core wall a base panel from which protrude the elongated light-conducting elements. Thus, just as with the above-described method for manufacturing a translucent building element, two compartments are created, each with a separation panel as a base panel and an opening opposite the base panel. By orientating the core wall formed by core elements and formwork in such a way that the opening of one of the compartments faces upwards, a compartment with an opening at the top is created containing elongated, light-conducting elements which protrude upwards from the base wall, whereby the ends of the elongated, light-conducting elements are located at a distance from the base wall. Thus, in a next step of the method for manufacturing a translucent building wall according to the invention, a hardening material in liquid form, such as concrete, can be poured in one of the compartments, until at or below the ends of the of the respective elongated light-conducting elements protruding through the separation panel, in order to then allow the hardening material to harden. Correspondingly, in a subsequent step involving turning over the core element and the formwork so that the as-yet unfilled other compartment is open towards the top, a hardening material in liquid form, such as concrete, can be poured in until at or below the ends of the respective elongated light-conducting elements protruding through the separation panel, in order to then allow the hardening material to harden. By subsequently removing the formwork, an insulated translucent building wall is achieved, where light can be guided by the elongated, light-conducting elements from one side of the building wall through the outer layers of hardened material, such as concrete, and the intermediate insulating core layer, to the other side of the building wall.

In an advantageous embodiment of the method for manufacturing a building wall according to the invention, the intermediate spaces filled with insulating foam of adjacent core elements are glued to each other. Thus can be achieved that the individual core elements do not move with respect to each other during and after the formation of the core wall.

In a further advantageous embodiment, one of two adjacent core elements is provided with a tongue and the other one is provided with a groove, so when placing the core elements against each other the tongue of one core element is inserted into the groove of the other core element, creating a tongue-and-groove connection between the core elements. Thus can be achieved that the individual core elements do not move with respect to each other during and after the formation of the core wall, and also ensures proper alignment of the elements when the core elements are placed in contact with each other.

The hardening material for the preferred embodiment for the method for the manufacture of a building element, and the method for the manufacture of a building wall, is concrete. The thus resulting sandwich construction, with two outer layers of concrete separated by a layer of insulating foam, is known and accepted in the construction industry. The invention now adds the option of guiding light through this well-known concrete sandwich structure.

Alternatively, the hardening material may be other hardening material than concrete, such as a hardening plastic.

The preferred embodiment for the method for the manufacture of a building element and the method for the manufacture of a building wall is that reinforcement for reinforcing the hardening material is applied before, during or after pouring a hardening material in one of the compartments. In an advantageous embodiment, the reinforcement comprises fibres, such as synthetic fibres or glass fibres, which are mixed with the hardening material before it is poured into the compartment. If concrete is used as hardening material, glass-fibre reinforced concrete results. Alternatively, a mesh reinforcement is placed in the compartment before, during, or after the pouring the hardening material, so that after the hardening of the hardening material it remains in the hardened material and reinforces the hardened material. The reinforcement mesh is then positioned between the optical elements, so that the optical elements protrude through the reinforcement mesh.

In the case of both the method for the manufacture of a building element, and the method for the manufacture of a building wall, an advantageous embodiment is to smooth the surfaces where the elongated, light-conducting elements end after the hardening of the liquid material. Thus, any ends of the elongated, light-conducting elements protruding from the hardening material are made flush with the surface of the hardening material from which they protrude, and the corresponding surface is made smooth in order to improve its appearance. Preferably, smoothing involves grinding, such as, for example, is known as concrete grinding of concrete surfaces.

A further aspect relates to a method for the manufacture of multiple stacked rows of elongated light-conducting elements for an insulating core element, more specifically a core element according to the invention. This method according to the invention results in multiple stacked rows of elongated light-conducting elements with separation panels.

The present technique also relates to a machine designed for the manufacture of a core element, according to the method as described above.

The present technique also includes a translucent building element or a translucent building wall, comprising an insulating core element in accordance with the aspect described above. According to this aspect, the building element also includes a first layer of hardened material substantially parallel to the first plane of the insulating core element, provided on the same side of the insulating core element as the first plane, and a second layer of hardened material substantially parallel to the second plane of the insulating core element, provided on the same side of the insulating core element as the second plane. In this building element, the first ends of the light-conducting elements are on the side of the first layer, substantially in the same plane as the outer side of the first layer; and the second ends of the light-conducting elements are on the side of the second layer, substantially in the same plane as the outer side of the second layer.

BRIEF DESCRIPTION OF THE FIGURES

The present invention is hereafter further explained using examples of embodiments, which are shown schematically in the attached figures. This concerns non-limitative embodiments. The figures show:

FIGS. 21 to 23, perspective view of a second embodiment of the manufacture of a core element according to an aspect mentioned above on the basis of the multiple of stacked rows of elongated light-conducting elements manufactured according to the method shown in FIGS. 1 to 3; and FIGS. 24 to 27, perspective views of a second embodiment of manufacturing a translucent building element according to an above-mentioned aspect.

DETAILED DESCRIPTION

Figure 1:
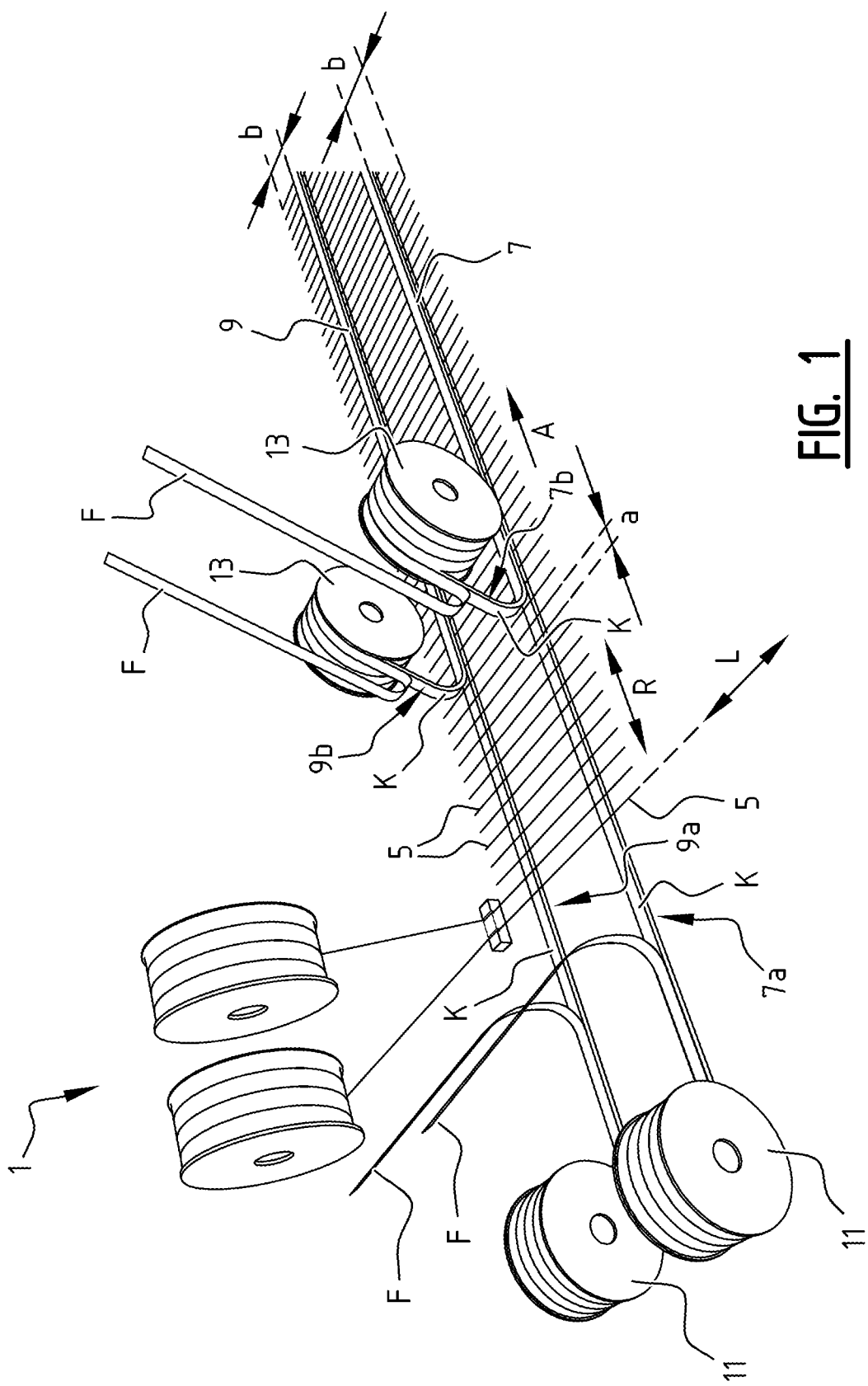
FIGS. 1 to 3, perspective views of the manufacture of a multiple of stacked rows of elongated light-conducting elements for an insulating core element in accordance with any one of the described alternative embodiments.
Figure 2:
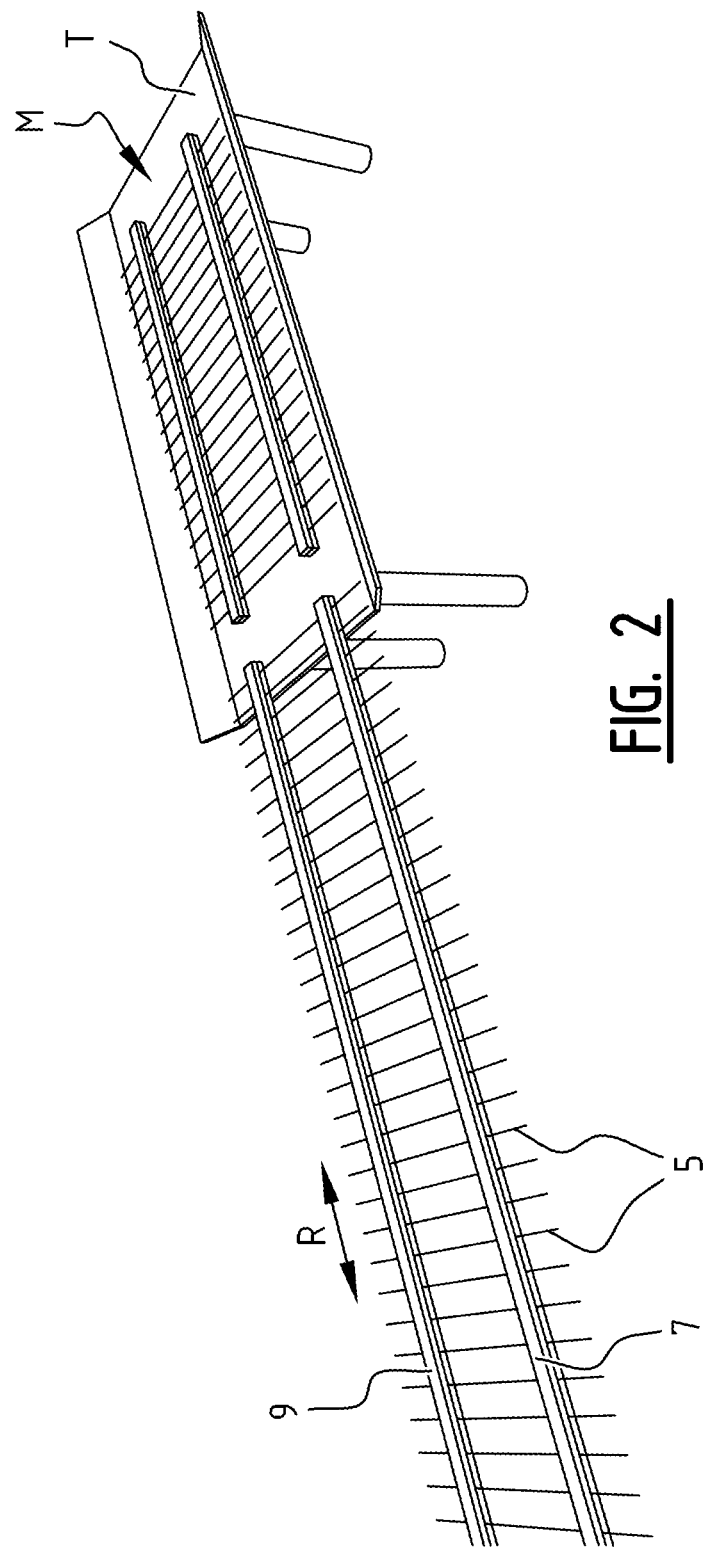
Figure 3:
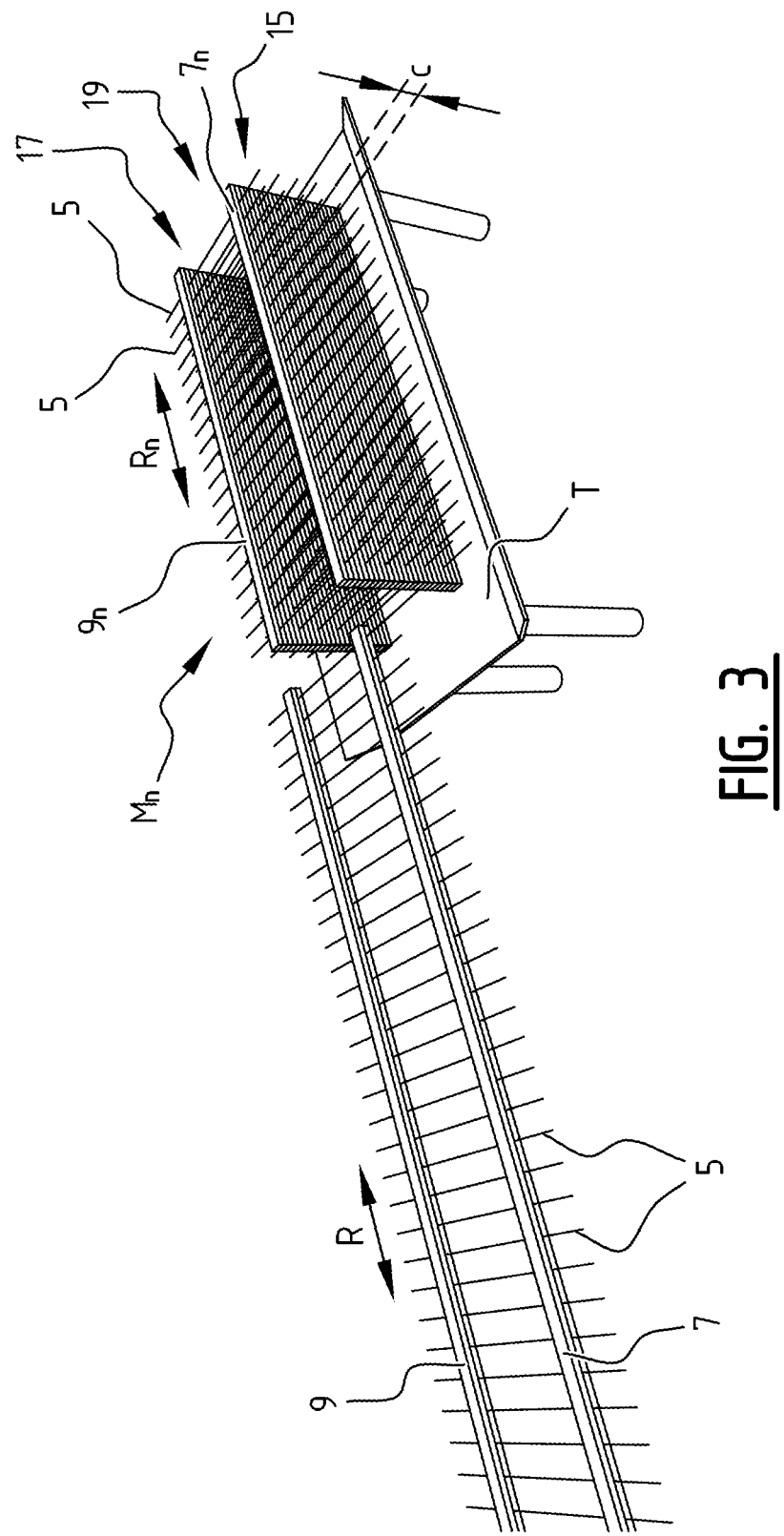

FIGS. 1 to 3 schematically show an embodiment of the method for manufacturing multiple stacked rows of elongated light-conducting elements for an insulating core element. According to the invention, this process is also part of the method for the manufacture of an insulating core element for a translucent building element. The method shown in FIGS. 1 to 3 is carried out by a machine.

FIG. 1 shows rolls 1 of synthetic thread material 3, more specifically rolls of transparent plastic thread, such as PMMA, with a cross-sectional diameter of 1 mm, which are drawn into elongated, light-conducting elements 5 which are arranged next to each other in a row R, and which are interconnected by means of two elongated connecting elements 7, 9 which extend parallel to one another and perpendicularly to the longitudinal direction L of the light-conducting elements 5. The light-conducting elements 5 are arranged at a centre-to-centre distance a, more specifically a centre-to-centre distance a of 6.5 mm. As shown in FIG. 1, the light-conducting elements are arranged on two elongated sectional elements 7a, 9a, which extend parallel to one another and perpendicularly to the longitudinal direction of the light-conducting elements. As shown, the light-conducting elements are of equal length, and the ends are aligned with each other.

The lower sections 7a, 9a are provided on their upward facing sides with an adhesive layer k with which the light-conducting elements 5 are brought into contact. The lower sections 7a, 9a are made of flexible material, and are drawn from two rolls 11. In addition to being flexible, the material is also preferably compressible in a direction parallel to the light-conducting elements 5. After arranging a number of light-conducting elements on the lower sections 7a, 9a, the lower sections and light-conducting elements 5 arranged on them are moved in the direction of arrow A, so that a subsequent part of the lower section is drawn from the rollers 11, upon which a number of light-conducting elements 5 is arranged as described above. As shown in FIG. 1, when lower sections 7a, 9a are drawn from the rollers 11, a protective film f on the adhesive layer is removed from the lower sections. As shown in FIG. 1, when moving the lower sections 7a, 9a and the light-conducting elements 5 arranged on them in the direction of arrow A, upper sections 7b, 9b are drawn from the two rollers 13 and positioned on the lower sections 7a, 9a and the light-conducting elements 5 arranged thereon. The upper sections 7b, 9b have an adhesive layer on the underside. When the upper sections 7b, 9b are drawn from the rollers 13, a protective film f on the adhesive layer k is removed from the sections. The upper sections 7b, 9b are thus glued onto the lower sections 7a, 9a and the light-conducting elements 5 arranged thereon by adhesive layers k, and form, together with the lower sections 7a, 9a, two connecting elements 7, 9 which extend parallel to each other and perpendicularly to the longitudinal direction L of the light-conducting elements 5. Although in the exemplary embodiment shown, both the upper and the lower sections 7a, 7b, 9a, 9b are provided with an adhesive layer k, as an alternative, only the upper sections 7a, 9a, or only the lower sections 7b, 9b may be provided with an adhesive layer k. Since the sections are made of compressible material, the sections form themselves at the light-conducting elements 5 around these elements 5. The sections are, for example, elements available in the market such as compriband, compressible strips or flexible foam material with an adhesive layer.

In this way, a row R of mutually connected, elongated, light-conducting elements 5 is manufactured. As shown, the connecting elements 7 and 9 are situated at a distance b from the ends of the light-conducting elements 5.

As shown in FIG. 2, the row R manufactured according to FIG. 1 of mutually connected, light-conducting elements 5 is formed into a light-conducting mat M1 by cutting off a part of manufactured row R. In FIG. 2, the first mat M1 is positioned on a stacking table T. By repeating the formation of a light-conducting mat M, and stacking the light-conducting mat Mn formed in this way on a previously formed light-conducting mat Mn−1, where the connecting elements 7n, 7n−1, 9n, 9n−1, of each combination of two stacked light-conducting mats M are brought into sealing contact with each other, multiple stacked rows Rn light-conducting elements 5 shown in FIG. 3 are obtained. In this stack S of rows of light-conducting elements 5, the centre-to-centre distance c between two light-conducting elements 5 of two rows stacked on top of each other Rn, Rn−1 depends on the thickness d of sections 7a, 7b, 9a, 9b of the connecting elements. A thickness d of a section of 3.25 mm results in a centre-to-centre distance c of 6.5 mm between two light-conducting elements of two rows stacked on top of each other. In the multiple of stacked rows Rn light-conducting elements 5 as shown in FIG. 3, the connecting elements 7, 9 form two separation panels 15, 17 which extend substantially perpendicularly to the longitudinal direction L of the light-conducting elements 5 and define between them an intermediate space 19.

Figure 4:
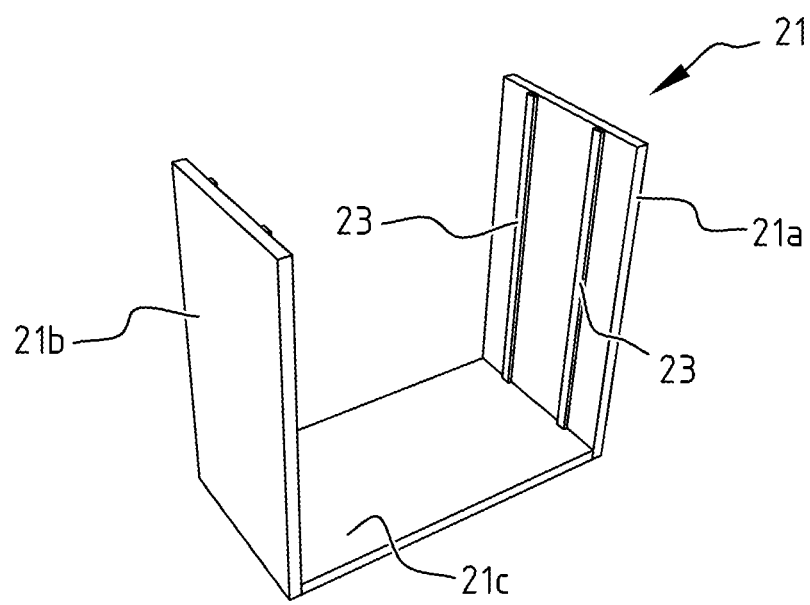
FIGS. 4 to 9, perspective views of a first embodiment of the production of a core element according to an aspect mentioned above, based on multiple stacked rows of elongated light-conducting elements manufactured according to the method shown in FIGS. 1 to 3.

As shown in FIG. 4, a light-conducting mat M is repetitively formed by taking a part of the manufactured row R, and the thus formed mat Mn is placed on a previously formed mat Mn+1 so as to obtain multiple stacked rows Rn light-conducting elements 5. Alternatively, it is possible to fold the manufactured row R, which is already a light-conducting mat in itself, in a zig-zag motion, so that each time after making a fold, a part of the mat after the fold is positioned on a part of the mat prior to the fold, so as to obtain multiple stacked rows Rn light-conducting elements 5 where each part of the mat between two folds is a mutually connected row of light-conducting elements 5. According to another alternative, after forming an interconnected row of light-conducting elements 5 in accordance with the manner shown in FIG. 1, a subsequent row of mutually connected light-conducting elements 5 is formed on the mutually connected light-conducting elements 5 manufactured earlier, in the manner shown in FIG. 1. In this latter alternative, the upper sections 7b, 9b can be left out. This has the advantage of simplifying the process, more specifically by reducing the number of operations. At a constant thickness d of the lower sections 7a, 9a, the vertical centre-to-centre distance c between light-conducting elements situated one above the other is smaller.

FIGS. 4 to 9 show an embodiment of the method according to the invention for the manufacture of an insulating core element. This method comprises providing a multiple of stacked rows of light-conducting elements, such as the multiple of stacked rows Rn of light-conducting elements shown in FIG. 3. The method shown in FIGS. 1 to 3 can thus precede the process shown in FIGS. 4 to 9, or be part of it.

Figure 5:
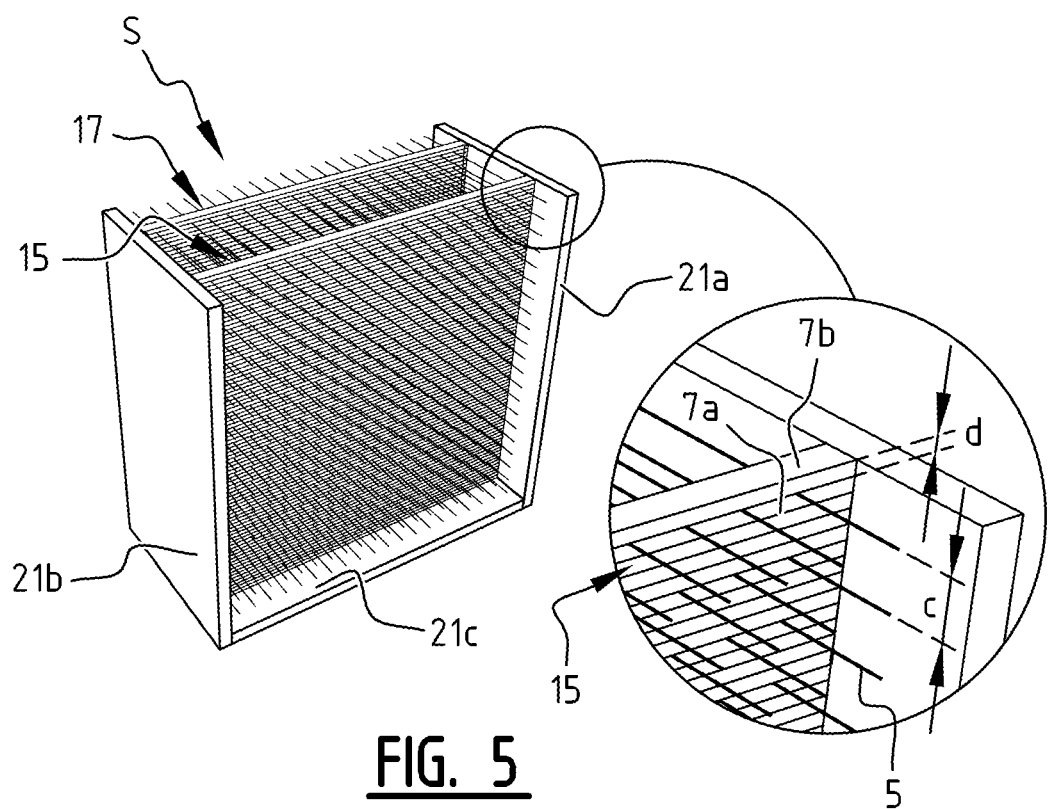
Figure 6:
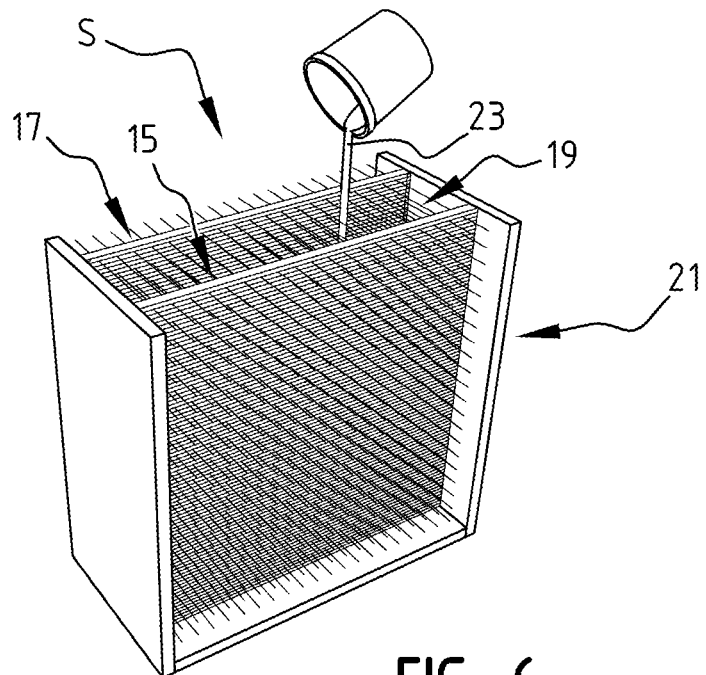
Figure 7:
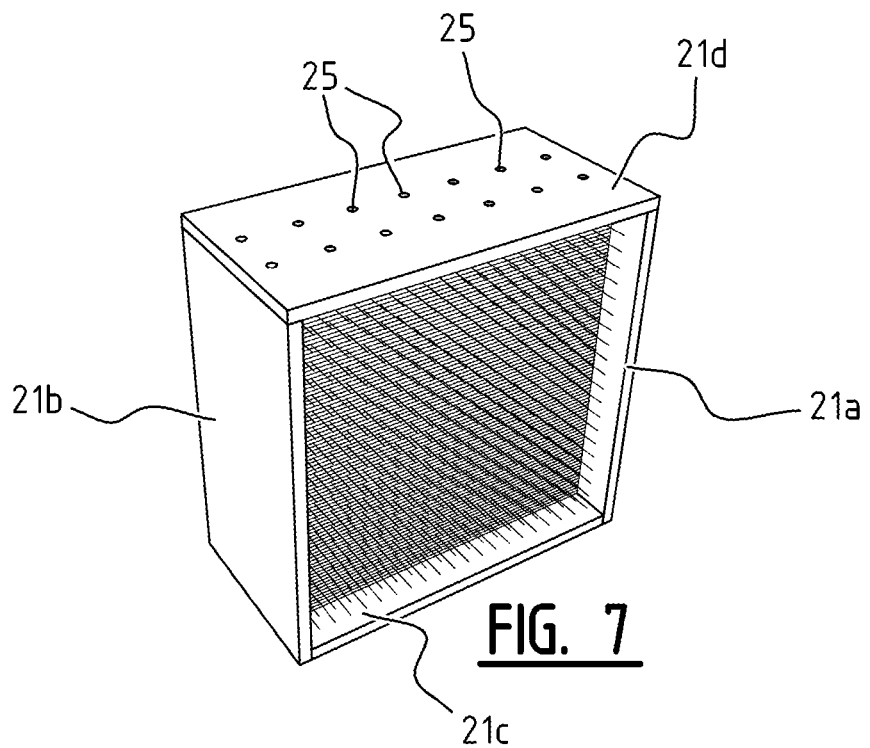
Figure 8:
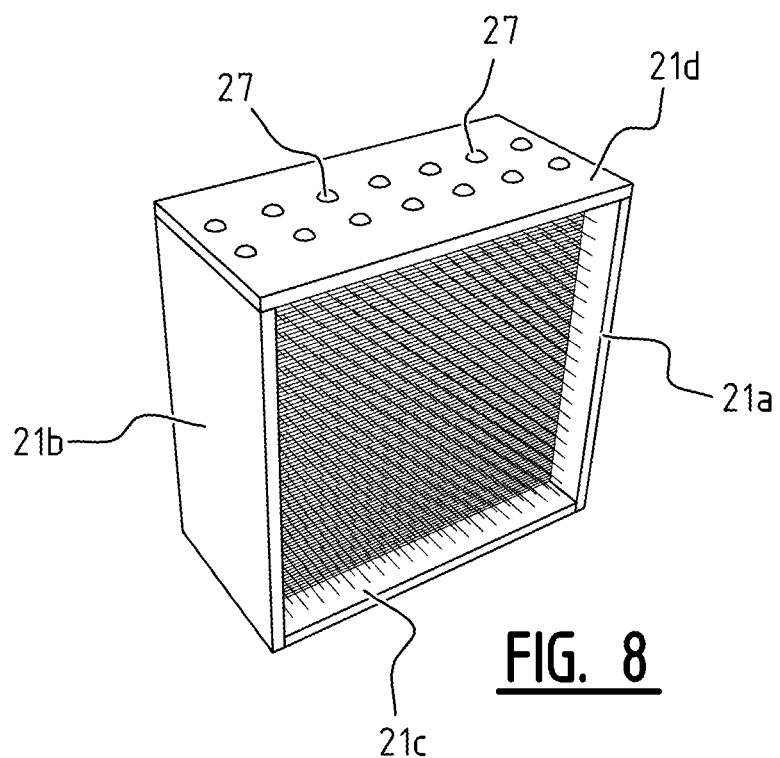

In FIG. 4, a formwork 21 is shown, where, as shown in FIG. 5, the stack S of multiple stacked rows of light-conducting elements 5 is placed. Sealing strips 23 are applied to the formwork, which contribute to good sealing between the ends of the connecting elements 7, 9 and the walls 21a, 21b of the formwork 21. The formwork 21 closes the intermediate space between two separation panels 15, 17 along three edges of the separation panels 15, 17 with three formwork walls 21a, 21b, 21c. As shown in FIG. 6, premixed reactive components 23 are poured into the closed intermediate space 19 between separation panels 15, 17, where these components react with each other to produce an insulating foam. As shown in FIG. 7, the open top of the intermediate space 19 containing the foam-forming reactive components 23 is closed by means of a fourth formwork wall 21d, so that the intermediate space 19 is closed along four edges of the separation panels 15, 17. As shown in FIG. 8, holes 25 in the fourth wall 21d allow excess foam 27 and air to leave the closed intermediate space 19 during the formation of the insulating foam. After the foam formation process has finished and any excess foam 27 which has left the intermediate space 19 has been removed, the result is an insulating core element 29 according to the invention, which is still contained in the formwork 21 in FIG. 9. In FIG. 10, the insulating core element 29 is shown without the formwork 21. The insulating core element 29 has a core layer 31 of insulating foam material, and the core layer 31 extends between the separation panels 15 and 17. The light-conducting elements 5 protrude on two sides of the core element 29 out of the separation panels 15, 17, and pass through the separation panels 15, 17 and the core layer 31.

FIGS. 11 to 14 show an embodiment of the method according to the invention for manufacturing a translucent building element. This method comprises providing an insulating core element, such as the core element 29 of FIG. 10. The method shown in FIGS. 4 to 9 can thus precede the process shown in FIGS. 11 to 14, or be part of it.

Figure 9:
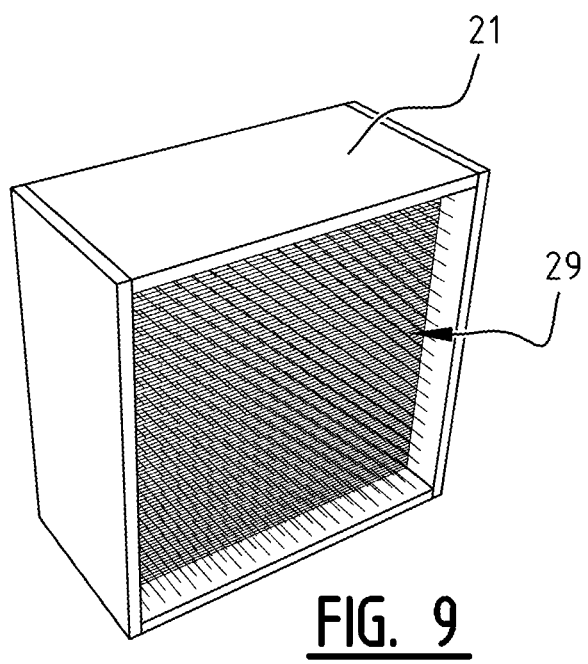
Figure 10:
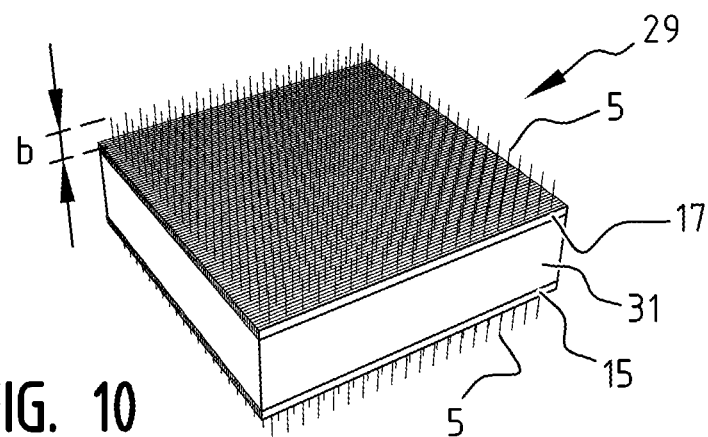
FIGS. 10 to 13, perspective views of a first embodiment of manufacturing a translucent building element according to an aspect mentioned above on the basis of the insulating core element manufactured according to the method shown in FIGS. 4 to 9.
Figure 11:
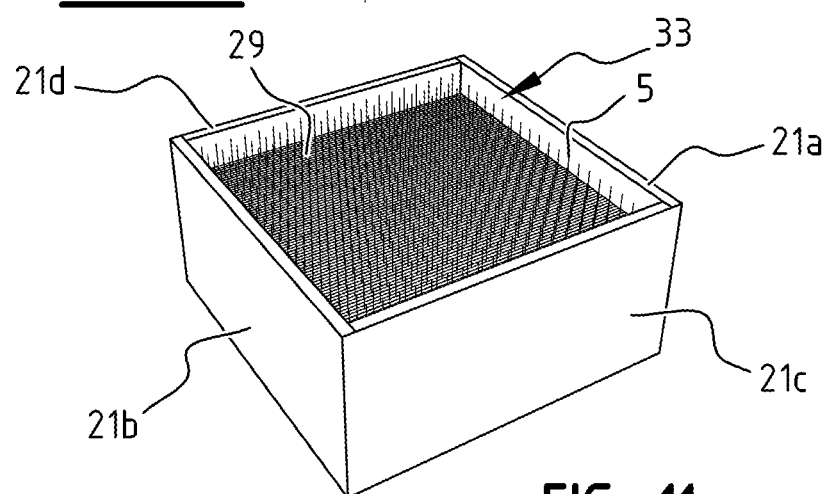

FIG. 11 shows that the insulating core element 29 in formwork 21 as shown in FIG. 9 is positioned such that the elongated light-conducting elements 5 are vertically oriented. The formwork 21 is designed such that it creates a compartment 33 on both sides of the insulating foam-filled intermediate space 19 of the insulating core element, wherein the formwork walls 21a, 21b, 21c, and 21d form the side walls of the compartment 33 and the respective separation panel 15, 17 forms a base wall from which the elongated light-conducting elements 5 protrude. In FIG. 11, one of the compartments 33 has its open side facing upwards. One of the ends of the light-conducting elements 5 protrude from the base of the compartment, formed by one of the separation panels 15, 17. As shown, the bending stiffness of the light-conducting elements 5 is that high that these elements remain upright independently over distance b, which is the distance between the ends of the light-conducting elements and the adjacent separation panel 15, 17.

Figure 12:
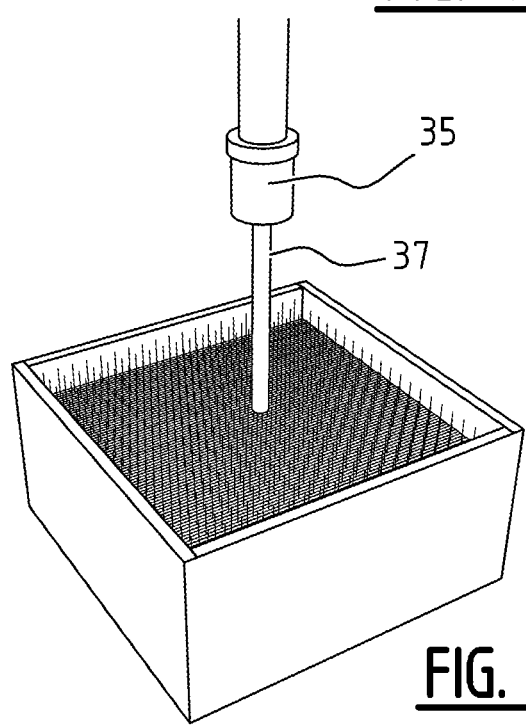
Figure 13:
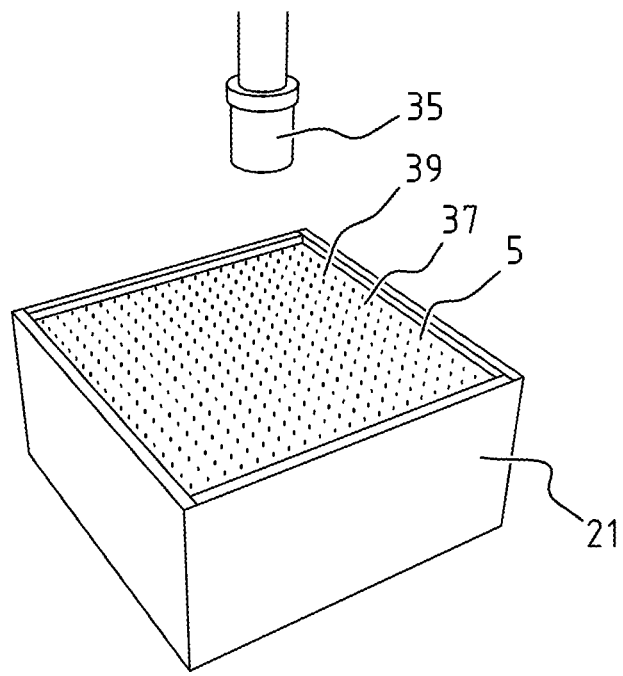
Figure 14:
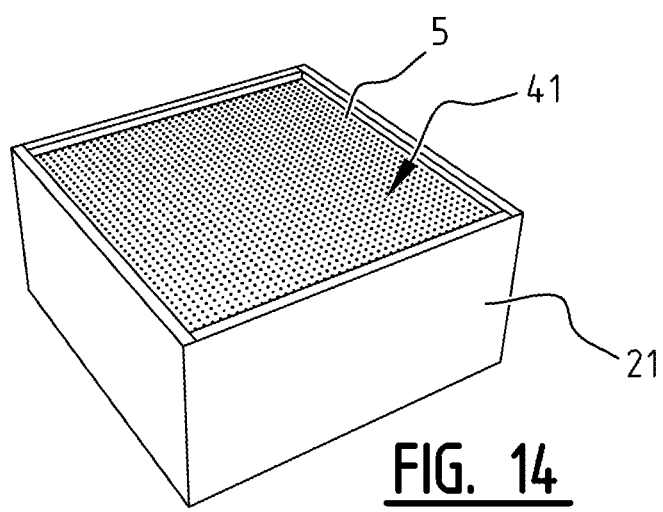
FIG. 14, a perspective view of a translucent building element manufactured according to the method shown in FIGS. 10 to 13.

FIG. 12 shows a lance 35 pouring a concrete mixture 37 in the compartment 33 of which the open side is facing upwards, which mixture is poured until the level shown in FIG. 13, below the respective ends of the light-conducting elements 5 protruding through the respective separation panel. After the concrete mix 37 has hardened, the surface 39 from which the ends of the light-conducting elements 5 slightly protrude is smoothed by concrete grinding, such that a smooth surface 41 is created on which the ends of the light-conducting elements 5 debouch, as shown in FIG. 14.

Then, the formwork 21 is turned over, such that the compartment on the other side of the insulating core element 29 has its open side facing upward, and the steps are repeated as described above with reference to FIGS. 10 to 13.

Figure 15:
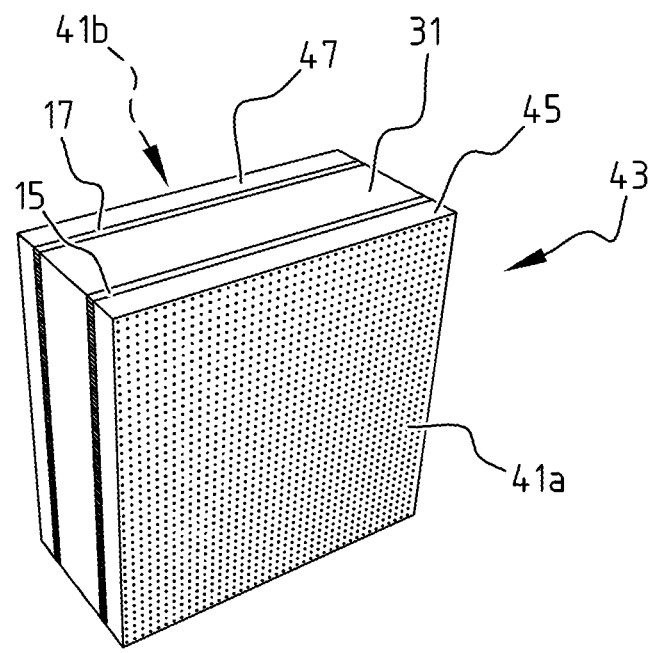
FIG. 15, a perspective view of a core element according to the invention.

After curing of the concrete mixture and smoothing of the corresponding surface, the formwork 21 is removed, and the translucent building element 43 shown in FIG. 15 is obtained. This building element 43 is, more specifically, an insulated, translucent concrete element with a sandwich structure. The sandwich construction comprises two outer shells 45, 47 or outer layers of concrete separated by a core layer 31 of insulating foam material. As shown in FIG. 14, the separation panels 15, 17 are visible in the building element 43. The light-conducting elements 5 extend through the concrete outer shells 45, 47 and core layer 31. The opposite ends of each light-conducting element 5 debouch in two opposite surfaces 41*a*, 41*b* of the concrete element 43. Light can enter the light-conducting elements 5 on one side of the concrete element 43, and is led by the light-conducting elements 5 through the outer shells 45, 47 of concrete and the core layer 31 of insulating foam to the opposite side of the building element 43, where it exits the ends of the light-conducting elements 5. Thus, a building element 43, more specifically a concrete sandwich element, is obtained with a translucent effect.

FIGS. 16 to 20 show an embodiment of the method according to the invention for manufacturing a translucent building wall. This method comprises providing multiple insulating core elements, such as multiple core elements 29 as shown in FIG. 10. The method shown in FIGS. 4 to 9 can thus precede the process shown in FIGS. 16 to 20, or be part of it.

Figure 16:
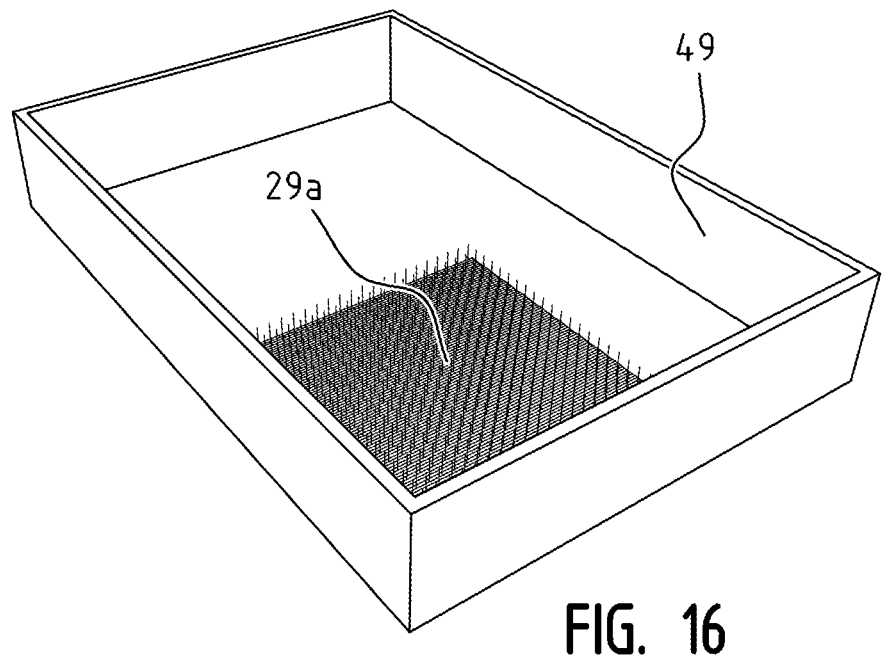
FIGS. 16 to 20, perspective views of a first embodiment of manufacturing a translucent building wall according to an aspect mentioned above on the basis of multiple insulating core elements, each manufactured according to the method shown in FIGS. 4 to 9.
Figure 17:
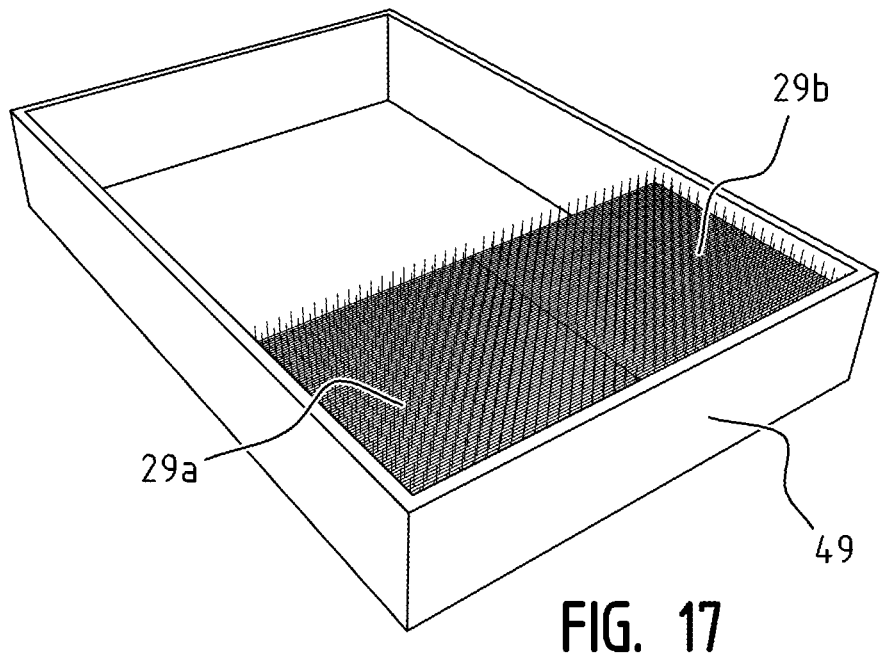
Figure 18:
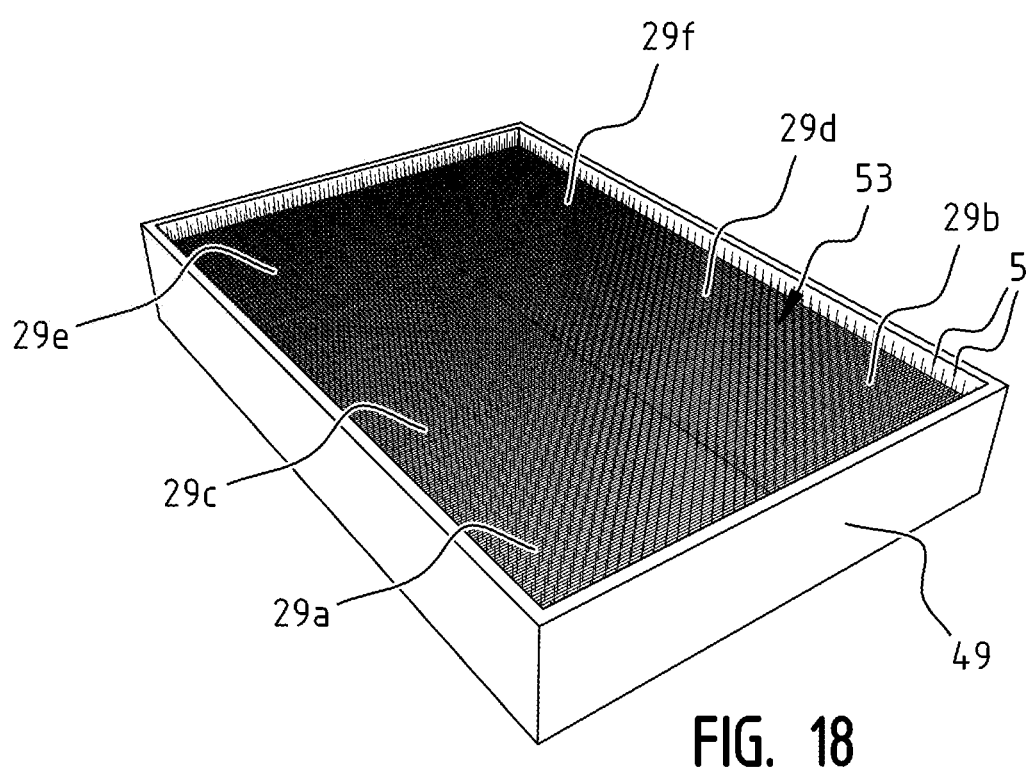

FIGS. 16 to 18 show how, according to the method according to the invention for manufacturing a translucent building wall, multiple core elements 29*a* to 29*f* are positioned in a formwork 49. The insulating foam-filled intermediate spaces 19 of adjacent core elements 29, in other words the core layers 31, are placed against each other to form a core wall. The separation panels 15, 17 of the core elements 29 then together form separation panels of the core wall. Preferably, core elements 29 are then glued to each other.

The formwork 49 which extends along the edges of the separation panels 51 of the obtained core wall, forms on both side of the core wall a compartment 53. The walls 49*a*, 49*b*, 49*c*, 49*d* of the formwork 49 form side walls of the compartment 53, and the corresponding separation panel of the core wall forms a base panel from which the elongated light-conducting elements 5 protrude.

FIG. 18 thus shows one of the compartments with the open side facing upwards. The ends of the light-conducting elements 5 protrude from the base of the compartment, formed by one of the separation panels of the core wall.

Figure 19:
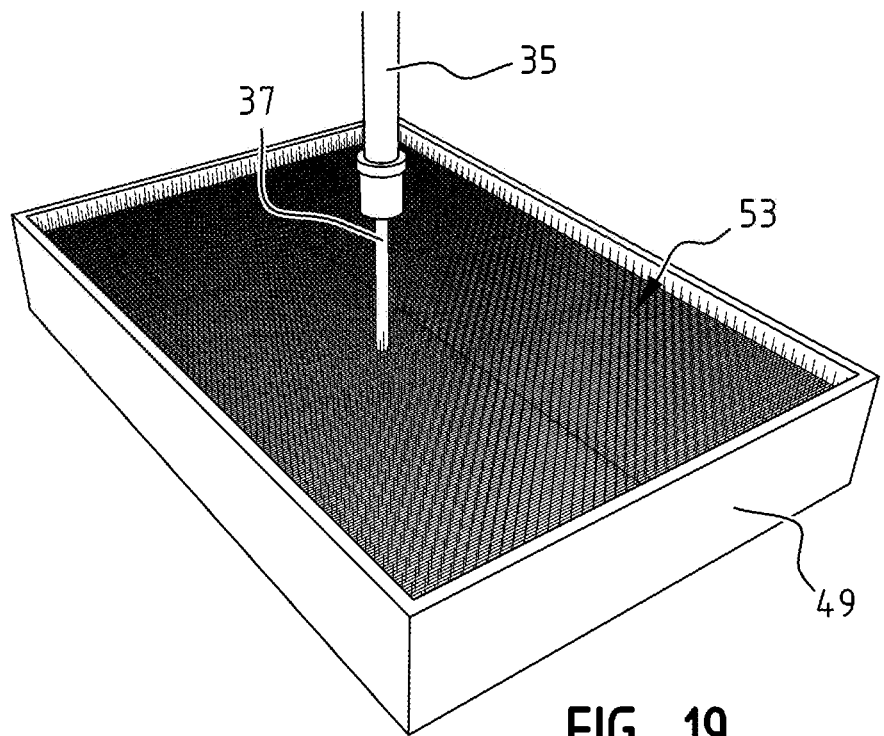
Figure 20:
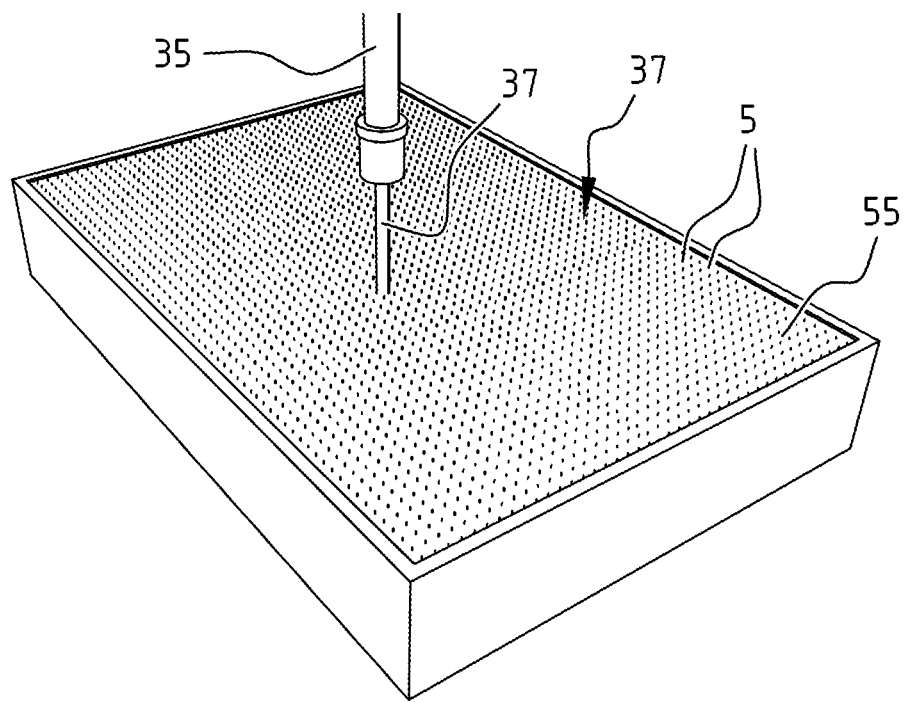

FIG. 19 shows a lance 35 pouring a concrete mixture 37 in the compartment 53 of which the open side is facing upwards up to, as shown in FIG. 20, below the ends of the light-conducting elements 5 protruding through the respective separation panel. After the concrete mix has cured, the surface 55 from which the ends of the light-conducting elements slightly protrude is smoothed by concrete grinding, so that a smooth surface is created from which the ends of the light-conducting elements 5 debouch.

Then, the formwork is turned over, so that the compartment on the other side of the core wall has its open side facing upwards, and the steps are repeated as described above with reference to FIGS. 19 to 20.

After curing of the concrete and smoothing of the corresponding surfaces 55 on both sides of the core wall, the formwork 49 is removed, and a translucent building wall obtained. This building wall is, more specifically, an insulated, translucent concrete wall with a sandwich construction. The sandwich construction is similar to that of the translucent building element 43 shown in FIG. 15. The sandwich construction comprises two outer shells or outer layers of concrete separated by a core wall of insulating foam material. The light-conducting elements extend through the concrete outer shells and core wall. The opposite ends of each light-conducting element debouch in the two opposite surfaces of the concrete wall. Light can enter the light-conducting elements on one side of the concrete wall, and is led by the light-conducting elements through the outer shells of concrete and the core wall of insulating foam to the opposite side of the concrete wall, where it exits the ends of the light-conducting elements. Thus, a building wall, more specifically a concrete sandwich wall, with a translucent effect is obtained. An alternative way to obtain the translucent building wall is to stack multiple translucent building elements of FIG. 15.

The method shown in FIGS. 16 to 20 is essentially the same as the process shown in FIGS. 11 through 14, although instead of one core element 29, multiple core elements are placed in a formwork.

FIG. 21 shows a further embodiment of the method for the manufacture of an embodiment of the insulating core element. FIG. 21 shows a first pair of auxiliary panels comprising a first auxiliary panel 17*a* and a second auxiliary panel 17*b*. FIG. 21 further shows a second pair of auxiliary panels comprising a first auxiliary panel 19*a* and a second auxiliary panel 19*b*. The auxiliary panels are preferably formed as discussed in the references to FIG. 4 and FIG. 5. An advantage of this method is that it is relatively simple to automate.

Alternatively, it is possible to provide the auxiliary panels as a whole as a flat surface, through which the light-conducting elements 5 are passed. Using modern weaving techniques, it is possible to direct elongated flexible elements such as the light-conducting elements 5 through a fabric with the aid of air or water pressure. Thus, it is possible to implement the auxiliary panels as woven or non-woven textile, through which, by means weaving techniques the light-conducting elements 5 can be shot.

Between the auxiliary panels of the first pair of auxiliary panels there is a first compartment 19*a*, and between the auxiliary panels of the second pair of auxiliary panels there is a second compartment 19*b*. The compartments are closed on three sides by means of a formwork 21. A foam-forming substance 23 is poured into the first compartment 19*a*, and a foam-forming substance 23 is poured into the second compartment 19*b*. Preferably, these foam-forming substances are the same. The foam-forming substances include, in one embodiment, two or more reactive components, which react with each other under the formation of foam when they are brought together.

Such a foam could be polyurethane foam, where the reactive components are a di-isocyanate or similar, and for instance a polyol. In another embodiment, the foam is expanded polystyrene. In this case, the foam-forming substance comprises only one substance, and foam-forming takes place under the influence of an external stimulus, preferably steam. In the case of polyurethane foam, the di-isocyanate could be seen as a foam-forming material in that context, and the polyols (or other substances with sufficient OH groups) seen as an external stimulus. Such foam-forming substances can also be used in the other embodiments discussed above.

FIG. 22 shows the arrangement as shown in FIG. 21, after formation of foam, and preferably after curing of the foam. The first pair of auxiliary panels with the foam between them forms a first separation panel 15, and the second pair of auxiliary panels with the foam between them thus forms a second separation panel 17. A foam-forming substance 23 is poured in intermediate space 19, which is located between the first separation panel 15 and the second separation panel 17. This may be the same foam-forming substance as used for the separation panels, but it may also be a different foam-forming substance.

The intermediate space 19 can be closed after the addition of the foam-forming substance, such as in the embodiments discussed above. After foam-forming and preferably hardening, the formwork 21 is removed. The result of this is shown in FIG. 23. FIG. 23 shows an insulating core element 29.

FIG. 24 shows a further embodiment of the method for the manufacture of an embodiment of the translucent building element. FIG. 24 shows a formwork 21. The height of formwork 21 is preferably substantially the same as the length b shown in FIG. 10. This length b indicates how far the light-conducting elements 5 protrude from the insulating core element 29. The difference between the height of the formwork 21 and the length b may vary a few percent without causing any problems, as further explained below. A lance 35 is used to pour a concrete mixture 37 in the formwork 21. The height of the layer of concrete is preferably substantially the same as the length b shown in FIG. 10. In another embodiment, the height of the formwork 21 is significantly higher than the length b, but the height of the layer of concrete is preferably substantially the same as length b.

After the concrete is poured into formwork 21, the insulating core element 29 is dipped in the concrete. This may be an insulating core element as shown in FIG. 10 or as shown in FIG. 23. This is shown in FIG. 25. In another embodiment, the formwork 21 is higher than shown. For example, the formwork can be as high as the length of the light-conducting elements 5.

After curing of the concrete 37, the formwork is removed to reveal a concrete outer shell 45, as shown in FIG. 26. Subsequently, as shown in FIG. 27, new formwork 21 is placed around the structure as shown in FIG. 26. This new formwork 21 preferably has the same height as the length of the light-conducting elements 5. If, in the steps shown in FIG. 24, and FIG. 25, a formwork is used with the same height as the length of the light-conducting elements 5, this does not need to be removed between operations, and no new formwork needs to be applied.

After the application of the formwork 21, a concrete mixture 37 is poured in the formwork by means of a lance 35. After hardening of the concrete 37, the formwork is removed, resulting in a translucent building element as shown in FIG. 15.

As indicated above, it is not necessary that the thickness of the layer of concrete applied directly exactly matches the length with which the light-conducting elements 5 protrude. After applying the concrete, it is possible to polish the concrete element 43 (FIG. 15). This polishing ensures that the concrete on opposite surfaces 41a, 41b is smooth. In addition, this can ensure that the ends of the light-conducting elements 5 coincide with the opposite surfaces 41a, 41b. If the layer of concrete as shown in FIG. 24 is slightly thicker than length b (FIG. 10), then the concrete surface 41b is polished to a thickness that is the same or less than length b. If the layer of concrete as shown in FIG. 27 is slightly thinner or thicker than length b, then the light-conducting elements 5 are shortened by means of polishing and/or other measures to the height of the concrete, and/or the concrete at the surface 41a is polished until the ends of the light-conducting elements 5 coincide with the opposite surfaces 41a, 41b.

The present invention is not limited to the above-described embodiments. The rights sought are defined by the following claims, within the scope of which many modifications can be envisaged, including the numbered embodiments specified below.

I claim:

1. A method of manufacturing an insulating core element for a translucent building element, comprising:
providing two separation panels which are substantially parallel to each other, which separation panels are provided with a grid of multiple elongated light-conducting elements which extend parallel to each other substantially perpendicularly to the two separation panels, and which extend through the separation panels, wherein the separation panels sealingly close off against the multiple elongated light-conducting elements extending through said panels;
applying a formwork so that an intermediate space between the separation panels is closed at least along these panels to form a compartment;
providing a foam-forming substance in the intermediate space between the separation panels which substance forms a mono-block of insulating foam; and
removing the formwork after the insulating foam is formed,
wherein the provision of two separation panels, respectively the auxiliary panels, comprises the provision of multiple stacked rows of elongated light-conductive elements, wherein each row comprises multiple elongated light-conducting elements positioned next to each other and which are mutually connected by means of at least two elongated connecting elements extending substantially parallel to each other and substantially transverse to the longitudinal direction of the light-conducting elements at a distance from the ends of the light-conducting elements, whereby the connecting elements of two rows stacked on top of each other are in sealing contact with each other, and with the light conducting elements positioned therebetween so that the connection elements of the stacked rows form at least two separation panels, respectively auxiliary panels, which extend substantially perpendicularly to the longitudinal direction of the light-conducting elements, and define an intermediate space, respectively compartment, between them.

2. The method according to claim 1, wherein providing two separation panels comprises:
providing a first set of auxiliary walls that are substantially parallel to one another, which auxiliary walls are provided with the grid of multiple elongated light-conducting element which extend parallel to each other substantially perpendicular to the auxiliary walls and which extend through the auxiliary walls such that between the auxiliary walls of the first pair of auxiliary walls an auxiliary space is provided;
providing a second set of auxiliary walls that are substantially parallel to one another; which auxiliary walls are provided with the grid of multiple elongated light-conducting elements which extend parallel to each other substantially perpendicular to the auxiliary walls and which extend through the auxiliary walls such that between the auxiliary walls of the second pair of auxiliary walls an auxiliary space is provided;
providing a formwork such that the first auxiliary space and the second auxiliary space are closed at least along at these panels of the compartments;

providing a foam-forming substance in the first auxiliary space between the separation panels which substance is to form a mono-block of insulating foam; and providing a foam-forming substance in the second auxiliary space between the separation panels which substance is to form a mono-block of insulating foam.

3. The method according to claim 1, wherein the separation panels, respectively the auxiliary panels, are flexible.

4. The method according to claim 1, wherein the light-conducting elements and the separation panels, respectively the auxiliary panels, have a sealed connection with each other such that a substantial leaking of reactive components, a mixture of foam-forming reactive components, an intermediate product of the reactive components and/or the foam through the separation panels, respectively the auxiliary panels, is not possible.

5. A method according to claim 1, wherein each separation panel has opposing surfaces, wherein the intermediate space is enclosed along three sides and surfaces of said two separation panels.

6. A method according to claim 1, wherein the separation panels are compressible.

7. A method according to claim 1, wherein each of the separation panels is formed by a plurality of elongated sectional elements that are sequentially positioned on top of each other to form a stack of elongated elements, wherein the grid of multiple elongated light-conducting elements is formed by a plurality of rows of multiple elongated light-conducting elements, wherein each row of multiple elongated light-conducting elements is positioned between two adjacent elongated sectional elements in the stack of elongated sectional elements.

8. A method according to claim 7, wherein the elongated sectional elements seal off against the multiple elongated light-conducting elements.

9. An insulating core element for a translucent building element comprising:
a mono-block of insulating foam;
a grid of multiple elongated light-conducting elements which extend parallel to each other, substantially perpendicular to a first plane of the mono-block and a second plane of the mono-block, wherein the second plane is situated opposite to the first plane, and wherein the light-conducting elements extend outside the mono-block;
multiple stacked rows of elongated, light-conducting elements, wherein
each row comprises a multitude of side-by-side oriented, elongated, light-conducting elements which are interconnected by means of at least two elongated connecting elements extending substantially parallel to each other and substantially perpendicularly to the longitudinal direction of the light-conducting elements at a distance from the ends of the light-conducting elements; and
the connecting elements of each two rows stacked on top of each other are in sealing contact with each other and with light-conducting elements positioned therebetween for forming sides of the mono-block, so that the connection elements of the stacked rows form at least two separation panels which extend substantially perpendicularly to the longitudinal direction of the light-conducting elements, and define an intermediate space between them which is filled with an insulating foam.

10. An insulating core element according to claim 9, wherein the elongated connecting elements are provided against the first plane and second plane and seal off against the multiple elongated light-conducting elements.

11. A translucent building element, comprising:
an insulating core element according to claim 9;
a first layer of hardened material, substantially parallel to the first plane of the insulating core element, provided on the same side of the insulating core element as the first plane; and
a second layer of hardened material, substantially parallel to the second plane of the insulating core element, provided on the same side of the insulating core element as the second plane,
wherein the first ends of the light-conducting elements on the side of the first layer substantially lie in the same plane as the outer side of the first layer; and
wherein the second ends of the light-conducting elements on the side of the second layer substantially lie in the same plane as the outer side of the second layer.

12. A method for manufacturing a translucent building element, comprising:
providing at least one insulating core element according to claim 9;
providing a formwork for the mono-block, so that a first compartment is formed, wherein the formwork forms side walls of the compartment;
applying a hardening material in liquid form in the first compartment;
bringing the first plane of the mono-block and the hardening material into contact, such that surfaces of the mono-block other than the first plane and the second plane substantially coincide with the side walls of the compartment;
allowing the hardening material to harden; and
removing the formwork.

13. The method according to claim 12, wherein:
the first plane of the mono-block forms a base surface of the compartment; and
applying a hardening material involves pouring a hardening material in the first compartment.

14. The method according to claim 12, wherein the formwork is arranged such that at a second side of the core element, which is located opposite the first side, a second compartment is formed, and the method further comprising applying a hardening material in liquid form in the second compartment.

15. The method according to claim 12, further comprising removing at least a portion of the light-conducting elements and/or material such that the ends of the multiple elongated light-conducting elements substantially lie in the same plane as a top of the layer of the hardening material.

16. A method for manufacturing a translucent building wall, comprising the following steps:
a core wall is formed with multiple insulating core elements, wherein each insulating core element comprises a mono-block of insulating foam; a grid of multiple elongated light-conducting elements which extend parallel to each other, substantially perpendicular to a first plane of the mono-block and a second plane of the mono-block, wherein the second plane is situated opposite to the first plane, and wherein the light-conducting elements extend outside the mono-block; multiple stacked rows of elongated, light-conducting elements, wherein each row comprises a multitude of side-by-side oriented, elongated, light-conducting elements which are interconnected by means of at least two elongated connecting elements extending substantially parallel to each other and substantially perpendicularly to the longitudinal direction of the light-conducting elements at a distance from the ends of the light-conducting elements; and the connecting elements of each two rows stacked on top of each other are in sealing contact with each other and with light-conducting elements positioned therebetween for forming sides of the mono-block, so that the connection elements of the stacked rows form at least two separation panels which extend substantially perpendicularly to the longitudinal direction of the light-conducting elements, and define an intermediate space between them which is filled with an insulating foam; a first layer of hardened material, substantially parallel to the first plane of the insulating core element, provided on the same side of the insulating core element as the first plane; and a second layer of hardened material, substantially parallel to the second plane of the insulating core element, provided on the same side of the insulating core element as the second plane, wherein the first ends of the light-conducting elements on the side of the first layer substantially lie in the same plane as the outer side of the first layer; and wherein the second ends of the light-conducting elements on the side of the second layer substantially lie in the same plane as the outer side of the second layer, wherein the intermediate spaces filled with insulating foam of adjacent core elements are placed against each other, and the separation panels of the core elements together form a separation panel of the core wall;

providing a formwork for the core wall, wherein the formwork forms the side walls of the compartment;

applying a hardening material in liquid form, such as concrete, in the first compartment;

bringing the first side of the core wall and the hardening material into contact, such that sides of the core wall other than the first side of the core wall substantially coincide with the side walls of the compartment;

allowing the hardening material to harden; and removing the formwork.

17. The method according to claim 16, wherein the formwork is arranged such that at a second side of the core wall, which is located opposite the first side, a second compartment is formed, and the method further comprising applying a hardening material in liquid form in the second compartment.

18. The method according to claim 16, wherein after curing of the hardening material, the surfaces from which the elongated, light-conducting elements debouch are made smooth.

19. A method for forming a building block, the method comprising:
placing two elongated sectional elements side by side with an intermediate space therebetween;
placing a series of elongated light-conducting elements having first and second ends perpendicular to and on said two elongated sectional elements, extending substantially parallel to each other in a longitudinal direction over the two elongated sectional elements and said intermediate space;
sealingly placing two further elongated sectional elements on top of the two elongated sectional elements extending over the series of elongated light conducting elements; and
repeating the steps of placing a series of elongated light conducting elements and further elongated sectional elements a plurality of times,
wherein two parallel separation panels with an intermediate space in between them and a grid of elongated light-conducting elements extending through the separation panels and crossing said intermediate space are formed,
wherein each series of elongated light-conducting elements positioned next to each other and which are mutually connected by means of at least two elongated connecting elements extending substantially parallel to each other and substantially transverse to the longitudinal direction of the light-conducting elements at a distance from the ends of the light-conducting elements, whereby the connecting elements of two rows stacked on top of each other are in sealing contact with each other, and with the light conducting elements positioned therebetween.

20. The method according to claim 19, wherein a hardening material in liquid form is provided and allowed to harden against the separation panels thus formed.

* * * * *